Oct. 15, 1957  J. J. HORNSTEIN  2,809,556
CONTACT LENS
Filed March 24, 1952
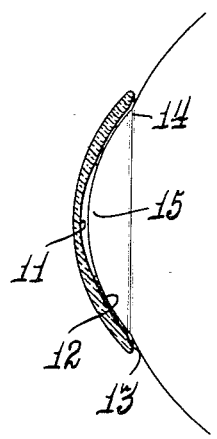
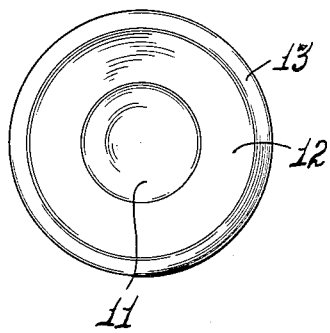
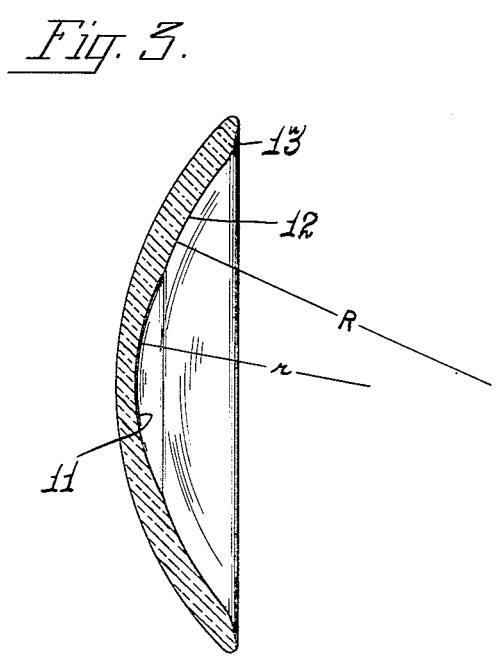
INVENTOR
JOSEPH J. HORNSTEIN
ATTORNEY

United States Patent Office 2,809,556
Patented Oct. 15, 1957

2,809,556

CONTACT LENS

Joseph J. Hornstein, Chicago, Ill., assignor to Dr. Ritholz & Sons Co., Chicago, Ill., a partnership Application March 24, 1952, Serial No. 278,156

4 Claims. (Cl. 88—54.5)

The invention relates to improvements in a corneal contact lens.

Corneal contact lenses, that is, lenses designed to cover the corneal region only of the eye, as now being produced, have a number of serious disadvantages which tend to render the wearing of them over a sustained period of time very objectionable. The cornea of the eye is not truly spherical from edge to edge, but is spherical only in its central portion or pupil (hereinafter termed the "apical area") of approximately five to ten millimeters in diameter, from which the radius of the cornea flattens or increases outwardly toward the limbal area. It is, therefore, apparent that a lens cannot be made with an inside curvature truly parallel to the curve of the cornea. If a lens having a radius parallel with the apical area of the cornea is used, the edges of the lens will rest on the limbus, shutting off circulation of the free flow of lachrymal fluids and also hindering the cornea from obtaining oxygen from the atmosphere both of which are necessary for lens tolerance. In the absence of the free circulation of oxygen and the free flow of fluids between the lens and the eye, there is a veiling and fogging of vision, and the wearing time is greatly limited. If a lens with a radius flatter than the curve of the cornea and of sufficient length to provide the required inside contour to clear the limbal area is used, such a lens will rest on the apex of the cornea (apical area), thus exerting pressure there, resulting in temporary flattening of the cornea. In the latter instance, a person may suffer from temporary "blindness" lasting for several hours even after the lens is removed. Also, such a lens will have little, if any, capillary attraction, and will slip over the cornea. The tendency of the lens to become dislodged or to fall out is great. Such a lens will cause a great amount of friction, resulting in corneal abrasions and ulcerations.

All of the foregoing and other known objectionable mechanical and physical characteristics of known corneal lenses, designed to lie within the area defined by the limbal region, are overcome by the structure of the lens of the present invention.

Briefly stated, the present lens has an inner central spherical area or optical zone which is vertically deeper in relationship to the marginal area of the lens. Otherwise stated, the marginal area of the lens follows substantially the curvature of the cornea from the limbal zone to the apical area, and the inner surface of the optical zone of the lens is on a smaller or sharper radius than the radius of the corneal apical area so as to insure absolute apical clearance. As above stated, the remaining or marginal part of the lens follows substantially the radius of the corneal peripheral area. As a result of such structure, there is no possibility of corneal abrasions or ulcerations, and the apical area of the cornea does not become flattened even temporarily. Because there is no physical contact in the apical area, the lens has excellent capillary attraction and has minimum friction and will not fall out or dislodge readily. It is easy to fit, comfortable to wear, and longer wearing time is afforded.

The instant contact lens requires no accessory fluid, and, accordingly, permits oxygen to circulate therebeneath, and it is entirely free from marginal aberrations, and may be easily and inexpensively manufactured.

It is, therefore, an object of the present invention to provide a corneal lens with a smaller radius on its inside surface in the area of its optical zone than on the inside surface of its marginal corneal area, and one which overcomes all of the known objectionable characteristics attributed to known types of corneal contact lenses.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Fig. 1 is a view illustrating, in section, a contact lens embodying the features of the present invention as applied to a human eye.

Fig. 2 is an inside elevational view of the corneal lens.

Fig. 3 is a transverse sectional view of the corneal lens on an enlarged scale.

The improved lens, which may consist of a blank made from any suitable transparent material, and, if desired, may be tinted to prevent glare or reduce penetration by ultra-violet and infrared rays, has an outside diameter or perimeter corresponding to or slightly less than the diameter of the limbal zone of the cornea and its edge may be rounded or tapered as required. The inside radius of its margin, that is, the marginal area surrounding the center portion or optical zone, corresponds substantially to the radius of the corneal peripheral area, and the inside surface of the center area has a smaller radius than that of the marginal area. This affords a structure wherein the center area of the lens, herein identified as the optical zone, is spaced from the apical area or pupil of the eye a distance sufficient to prevent flattening of the apical area or causing corneal abrasions or ulcerations.

Referring now to the accompanying drawing, and particularly to the Fig. 3 disclosure, the improved lens has an optical zone 11 and a surrounding marginal area 12. The optical zone is the area of the lens which overlies the apical area of the eye, and although its diameter may vary in accordance with variations in the diameter of the apical area, it has been found that a diameter of 8 mm. is suitable in most instances. The outside or perimeter diameter of the lens, which corresponds substantially to but never exceeds the diameter of the limbal area, may vary in specific cases from 10.50 mm. to 14 mm.

As indicated in the drawing, the inside surface of the corneal or marginal area 12 is cut on a radius "R" corresponding substantially to the radius of the corneal peripheral area, and its perimeter may be tapered or rounded, as at 13, so as not to impinge upon the limbal zone 14 at its point of termination. The radius "$r$" of the inside surface of the optical zone 11 of the lens is substantially less than the radius "R" so that a shallow recess or well is provided on the inside surface of the lens. This recessed optical zone overlies the apical area 15 and because of its curvature with respect to the curvature of the underlying corneal apical area there is provided a crescent-shaped space and there never is any contact between the lens and the pupil. The clearance spaces between the lens and the eye enables the natural eye fluids and air to enter between the lens and the cornea and materially contributes to holding the lens in place by capillary attraction.

Optical correction may be ground on the exterior surface of the lens and the lens may have any specific perimeter configuration such as, for example, round, elliptical, oval, or triangular, as may be required to fit a specific cornea.

With the lens of the present invention, it is not a difficult matter to fit a patient with the lens. Having determined the dimensions of the corneal radius and the diameter of the limbal zone, it is a relatively simple matter to select a blank having the required dimensions to then grind the necessary optical correction therein. In view of the fact that no solutions or fluids are required, it is not difficult for a patient to soon become accustomed to wearing the lens for long periods of time. Of course, it is advisable to moisten the lens with water before applying it to the eye.

It has been established that a lens made in accordance with the teachings of the present invention can be worn over long periods of time without irritation of the cornea or flattening or aberration of the pupil.

Although an exemplary form of the present invention has been shown in the accompanying drawings and described in detail in the foregoing specification, it should be understood that the invention is capable of embodying various modifications in detail or design without departing from the spirit of the present invention or the scope of the appended claims.

I claim:

1. A corneal contact lens of concavo-convex form in section and of a size to lie within the area defined by the limbus having an inner central spherical area corresponding in its perimeter to the perimeter of the apical area of the cornea to which the lens is applied and formed on a smaller radius than the radius of said apical area so that a crescent-shaped space is present between said central spherical area and the surface of said apical area, and the remainder of the inner surface of said lens extending radially outwardly toward the limbus being formed on a greater radius than said central area and corresponding in curvature with the corneal peripheral area.

2. A corneal contact lens of concavo-convex form in section and of a size to lie within the area defined by the limbus having an inner central spherical area formed on a radius substantially smaller than the radius of the corresponding area of the cornea to which the lens is applied, so that a crescent-shaped space is present between said central spherical area and said corresponding area of the cornea, whereby pressure on the said corneal area is avoided, and the remainder of the inner surface of said lens extending radially outwardly toward the limbus being formed on a curve different from that of said central area and corresponding in curvature with that portion of the corneal peripheral area to which the lens is applied.

3. A corneal contact lens of concavo-convex form in section and of a size to lie within the area defined by the limbus having an inner central spherical area formed on a radius substantially smaller than the radius of the corresponding area of the cornea to which the lens is applied, so that a crescent-shaped space is present between said central spherical area and said corresponding area of the cornea, whereby pressure on the said corneal area is avoided, and the remainder of the inner surface of said lens extending radially outwardly toward the limbus being formed on a curve different from that of said central area and corresponding in curvature with that portion of the corneal peripheral area to which the lens is applied, said central spherical area of the lens and the corresponding area of the cornea defining in section a crescent-shaped tear space.

4. A corneal contact lens of concavo-convex form in section having a diameter falling within the area defined by the limbal zone of the cornea to which it is to be fitted, said lens having an inner central spherical area and a wide marginal area, the inside radius of the marginal area being formed on a curve corresponding substantially to the curvature of the peripheral area of the cornea, and the curvature of the central spherical area having a smaller radius than the radius of the corresponding area of the cornea so as to avoid conforming with said corneal area whereby a substantially crescent-shaped space is provided between said central spherical area and the cornea.

References Cited in the file of this patent

UNITED STATES PATENTS

| | | |
|---|---|---|
| 1,921,971 | Fertsch et al. | Aug. 8, 1933 |
| 2,198,868 | Feinbloom | Apr. 30, 1940 |
| 2,247,628 | Beitel | July 1, 1941 |
| 2,438,743 | Feinbloom | Mar. 30, 1948 |
| 2,510,438 | Tuohy | June 6, 1950 |
| 2,544,246 | Butterfield | Mar. 6, 1951 |
| 2,653,515 | Stimson | Sept. 29, 1953 |

OTHER REFERENCES

"The Corneal Lens," article by Dickinson in "The Optician," September 2, 1949, published in London, England, pages 141–144.

"Corneal Contact Lenses," article by Bier in "The Optician," September 9, 1949, published in London, England, page 185.

"The Vimax Contact Lens," article by Steele in "The Optician," June 16, 1950, published in London, England, pages 575 and 584.

"The Corneal Lens," article by Jones in "The Optician," October 6, 1950, published in London, England, pages 287–293.

"Corneal Lenses—Another Viewpoint," article by Bier in "The Optician," November 10, 1950, published in London, England, pages 435 and 436.